United States Patent Office 3,459,813
Patented Aug. 5, 1969

3,459,813
CONVERSION OF DISULFIDES TO ALCOHOLS
Robert A. Dombro, Chicago, Ill., assignor to Universal Oil Products Company, Des Plaines, Ill., a corporation of Delaware
No Drawing. Continuation-in-part of applications Ser. No. 508,583, Nov. 18, 1965, and Ser. No. 513,098, Dec. 10, 1965. This application Dec. 28, 1967, Ser. No. 694,100
Int. Cl. C07c *31/02*
The portion of the term of the patent subsequent to Dec. 24, 1985, has been disclaimed
U.S. Cl. 260—632    10 Claims

ABSTRACT OF THE DISCLOSURE

Preparation of an alcohol by heating a dihydrocarbyl disulfide, particularly a dialkyl disulfide, in alcoholic solution with a molar excess of a cleaving agent, such as sodium hydroxide, at a temperature of at least about 100° C. the disulfide being characterized in that at least one of the hydrocarbyl substituents thereof has a hydrogen atom attached to the carbon atom which is bonded to the disulfide group.

RELATED APPLICATIONS

This application is a continuation-in-part of a copending application Ser. No. 508,583 filed Nov. 18, 1965, and a copending application Ser. No. 513,098 filed Dec. 10, 1965, both of said applications being now abandoned.

BACKGROUND OF THE INVENTION

This invention relates to a novel process for the preparation of alcohols, particularly the $C_8+$ alcohols extensively employed as solvents in medicinal and cosmetic preparations, in perfume manufacture, as extractants and solvents for materials in lacquers and varnishes as alkylating agents in the preparation of synthetic detergents, and as intermediates in organic synthesis, for example, in the manufacture of plasticizers for synthetic resins.

The direct oxidation of hydrocarbons utilizing atmospheric oxygen is a relatively inexpensive process. However, the oxidation reaction mixture invariably comprises a mixture of first, second, and third stage oxidation products, e.g., alcohols, ketones, aldehydes, carboxylic acids, and the like. In those cases where it has been possible to inhibit the oxidation beyond the first stage to give principally an alcohol product, the alcohol product comprises a mixture of secondary alcohols, the extent of the mixture depending on the number of carbon atoms in the alcohol chain. In many instances it is desirable not only to produce alcohols to the substantial exclusion of other oxidation products, but also to produce primary alcohols. For example, it is generally considered that primary alcohols when utilized in the manufacture of plasticizers give a product of greater thermal and oxidation stability.

It is an object of this invention to present a novel process for the preparation of alcohols to the substantial exclusion of other oxidation products and uniquely adapted to the preparation of primary alcohols. It is a more specific object to convert dihydrocarbyl disulfides, as herein defined, to alcohols in the presence of alkali by a process affording improved and substantial yields of said alcohols.

It has heretofore been observed that mercaptans in the form of mercaptides are hydrolyzable to alcohols in the presence of alkali, and this would appear to be a convenient route to the desired alcohols. However, only trace amounts of alcohol product have been reported and the process has little if any commercial significance. Also, certain disulfides, aptly described as activated disulfides, have been shown to be hydrolyzable in the presence of alkali. However, no alcohol is apparent in the product mixture and hydrogen sulfide, sulfur, sulfinic acids, carbonyl compounds and thio acids have all been observed as products. The so-called activated disulfides are such as diaryl disulfides, disulfides with carbonyl functions, or disulfides with unsaturated groups attached to an alpha carbon atom. In contrast, the dialkyl disulfides have heretofore been considered to be very stable to alkali, for example see Chem. Rev., 59, 608 (1959).

SUMMARY OF THE INVENTION

In one of its broad aspects, the present invention embodies a process for preparing an alcohol which comprises heating a dihydrocarbyl disulfide at a temperature of at least about 100° C. in solution with a molar excess of a cleaving agent selected from the group consisting of the hydroxides and alkoxides of the alkali and alkaline earth metals and forming the corresponding alcohol and mercaptan as cleavage reaction products, the aforesaid disulfide being represented by the general formula R—S—S—R' wherein R and R' are hydrocarbyl radicals at least one of which is selected from the group consisting of alkyl, cycloalkyl and aralkyl.

A more specific embodiment relates to a process for preparing an alcohol which comprises heating a di-n-alkyl disulfide at a temperature of at least about 100° C. in solution with a molar excess of an alkali metal hydroxide and forming the corresponding alcohol and mercaptan, said process being further characterized in that said disulfide is heated in solution with the said alkali metal hydroxide and in contact with a mild oxidizing agent whereby said disulfide is reformed from said mercaptan.

One of the more specific embodiments of this invention is in a process for preparing n-dodecyl alcohol which comprises heating di-n-dodecyl disulfide at a temperature of from about 100° C. to about 300° C. in solution with a molar excess of sodium hydroxide and in contact with dimethyl sulfoxide and forming n-dodecyl alcohol.

Other objects and embodiments of this invention will become apparent in the following detailed specification.

In accordance with the process of this invention, a dihydrocarbyl disulfide starting material is converted to a corresponding alcohol. Dihydrocarbyl disulfides may be represented by the general formula R—S—S—R' wherein R and R' can be the same or different alkyl, cycloalkyl, aryl, alkaryl or aralkyl radical, at least one of which is attached to the disulfide (—S—S—) radical by means of a carbon atom containing at least one hydrogen atom attached thereto. Thus, R and R' are hydrocarbyl radicals at least one of which is selected from the group consisting of alkyl, cycloalkyl and aralkyl. Hydrocarbyl disulfides which can be treated in accordance with the present process to convert the same to the corresponding alcohol thus include aralkyl disulfides such as benzyl disulfide, di-β-phenethyl disulfide, alkyl aryl disulfides such as ethyl phenyl disulfide, etc. alkaryl alkyl disulfides such as p-tolyl ethyl disulfide, p-tolyl isopropyl disulfide, etc., and cycloalkyl disulfides like dicyclopentyl disulfide and dicyclohexyl disulfide. The present process is particularly suitable for the conversion of alkyl disulfides, for example, di-n-propyl disulfide, diisopropyl disulfide, isopropyl methyl disulfide, di-n-butyl disulfide, di-sec-butyl disulfide, diisobutyl disulfide, di-n-amyl disulfide, n-amyl sec-amyl disulfide, and also the higher homologs thereof including the various structural isomers of dihexyl disulfide, diheptyl disulfide, dioctyl disulfide, dinonyl disulfide, didecyl disulfide, diodecyl disulfide, etc., wherein the alkyl substituents contain up to about 20 carbon atoms. The process of this invention is especially useful in the preparation of primary alcohols utilizing a di-n-alkyl disulfide as a starting material to yield the corresponding primary alcohol.

Pursuant to the further process of this invention, the selected hydrocarbyl disulfide is prepared in solution with a cleaving agent which can be a hydroxide or an alkoxide of a metal of Groups I and II, i.e., alkali and alkaline earth metals, and the resulting solution is heated at a temperature of at least about 100° C., and suitably at a temperature of from about 100° C. to about 300° C., thereby effecting cleavage of the disulfide to form a mercaptan and the related alcohol. Thus, di-n-dodecyl disulfide is converted to n-dodecyl mercaptan and the related n-dodecyl alcohol. Any material suitable as a co-solvent for the disulfide and the cleaving agent which is substantially inert at reaction conditions can be utilized. The low molecular weight alcohols, such as methanol, ethanol, isopropanol etc., have been found to be particularly useful to solubilize the disulfide together with the cleaving agent. Aqueous, low molecular weight alcohol solvents containing up to about 50 weight percent water, preferably 10 weight percent water, may also be employed.

Suitable cleaving agents preferably include the various alkali metal and alkaline earth metal hydroxides, for example, sodium hydroxide, potassium hydroxide, lithium, hydroxide, cesium hydroxide, rhubidium hydroxide, beryllium hydroxide, magnesium hydroxide, calcium hydroxide, strontium hydroxide, barium hydroxide, etc. Suitable cleaving agents also include the alkali metal and alkaline earth metal alkoxides, particularly the sodium and potassium alkoxides such as sodium methoxide, potassium methoxide, sodium ethoxide, potassium ethoxide, sodium propoxide, potassium propoxide, sodium isopropoxide, potassium isopropoxide, sodium butoxide, sodium isobutoxide, potassium isobutoxide, potassium t-butoxide, sodium t-butoxide, and the like.

The cleaving agent is preferably utilized in at least a slight molar excess with respect to the disulfide being treated, preferably a molar excess of about 4:1 or more. As previously mentioned, the disulfide-cleaving agent solution is heated at a temperature of at least about 100° C. thereby effecting cleavage of the disulfide to form a mercaptan and the related alcohol. Optimum yield with a minimum of undesirable by-products is attained at a temperature in the range of from about 100° C. to 300° C.

The alkaline cleavage reaction mixture comprises an alcohol and a mercaptan as major products of the reaction. In one preferred embodiment of this invention, a mild oxidizing agent is included in the cleavage reaction mixture whereby the mercaptan portion of the cleavage reaction mixture is oxidized back to the disulfide. The disulfide thus formed in the alkaline cleavage reaction mixture is in turn converted to more alcohol and a mercaptan thus increasing the over-all yield of the desired alcohol. Mild oxidizing agents in general are suitable to effect an increase in alcohol yield although not necessarily with the same or equivalent results. Usually the number of moles of oxidant used does not exceed the number of moles of dihydrocarbyl disulfide treated. Suitable oxidizing agents include hydrogen peroxide, potassium peroxy disulfate, sodium hypochlorite, air, etc. Sulfoxides, represented by the general formula

wherein R and R' may be the same or different alkyl, cycloalkyl, aryl, alkaryl, or aralkyl, are particularly preferred oxidizing agents. Preferred sulfoxides thus include dialkyl sulfoxides such as dimethyl sulfoxide, diethyl sulfoxide, di-n-propyl sulfoxide, diisopropyl sulfoxide, di-n-butyl sulfoxide, diisobutyl sulfoxide, ethyl methyl sulfoxide, methyl propyl sulfoxide, etc., as well as cycloalkyl sulfoxides like tetramethylene sulfoxide, pentamethylene sulfoxide, and the like, and also diaryl sulfoxides such as diphenyl sulfoxide, diaralkyl sulfoxides like dibenzyl sulfoxide, and dialkaryl sulfoxides like di-p-tolyl sulfoxide.

In general, sulfoxides may be prepared by oxidation of sulfides, the proportion of oxidant and the temperature being adjusted to prevent excessive oxidation and consequent formation of a sulfone. Among the chemical oxidants used are nitric acid, hydrogen peroxide, chromic acid or dichromates, organic peroxides, hypochlorites, oxides of nitrogen, air oxidation etc.

Recovery of the alcohol product can be by any conventional or otherwise convenient means. Where the cleavage reaction mixture comprises an alcohol product of less than about 8 carbon atoms, the alcohol can be recovered by means of a suitable extractant. For example, after distilling the solvent from the cleavage reaction mixture, the residual reaction mixture, comprising the alcohol, mercaptide, alkali and any unreacted disulfide, is ether extracted. The alcohol and any unreacted disulfide are recovered in the ether extract together with any higher boiling by-products. After flashing off the ether, the alcohol and disulfide are readily separated from each other and from any higher boiling by-products by distillation methods. Alternatively, the alcohol can be recovered from the cleavage reaction mixture by stream distillation. The remaining mercaptides in either case can be utilized as a portion of the previously mentioned mercaptide treated at oxidation conditions whereby the mercaptide is converted to the disulfide.

One convenient method, particularly with respect to the $C_8+$ alcohols, comprises treating the cleavage reaction mixture in substantially the same manner as hereinabove taught with respect to the treatment of the mercaptide whereby said mercaptide is converted to the disulfide.

In other words, the cleavage reaction mixture, comprising an alcohol, a mercaptide and, most usually, a mixture of higher boiling by-products in alkaline media, is treated at oxidation conditions whereby the mercaptide portion thereof is converted to the disulfide. Thus, the cleavage reaction mixture is converted to a mixture of the desired alcohol and a disulfide readily separated from each other and from any higher boiling by-products by fractional distillation means. When separation is effected by the last described method the disulfide fraction can be utilized as a portion of the disulfide treated in solution with a cleaving agent in the manner previously described.

The process of this invention is further illustrated by the following examples.

Example I

A reaction mixture was prepared by adding 0.05 mole of di-n-dodecyl disulfide to 0.5 mole of sodium hydroxide in solution with 150 cc. of 95% ethanol. The reaction mixture was charged to a glass lined rotatable autoclave of about 850 cc. capacity and sealed therein under 30 atmospheres of nitrogen. The autoclave was rotated and heated at 100–200° C. for about 5 hours. Thereafter, the autoclave was cooled to room temperature and discharged to the atmosphere. The reaction mixture comprises a 72 mole percent yield (0.032 mole) of n-dodecyl alcohol (based on the equation

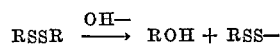

and at 98 mole percent yield (0.044 mole) of n-dodecyl mercaptan co-product based on converted disulfide (95%). Products were identified by gas-liquid chromotography analysis, etc.

Example II

In this example, the initial reaction mixture was prepared by adding 0.05 mole of di-n-dodecyl disulfide and 0.025 mole of dimethyl sulfoxide to 0.2 mole of sodium hydroxide in solution with 150 cc. of 95% ethanol. The reaction mixture was sealed in the autoclave under 30 atmospheres of nitrogen and heated at 100–200° C. for about 5 hours. Thereafter, the autoclave was cooled and discharged to the atmosphere. The reaction mixture contained a 46 mole percent yield (0.045 mole) of n-dodecyl alcohol and a 30 mole percent yield (0.029 mole) of n-dodecyl mercaptan co-product based on converted disulfide (100%).

Example III

A reaction mixture comprising about 0.05 mole of di-n-dodecyl disulfide and 0.2 mole of sodium hydroxide in solution in 116 grams of absolute ethanol was sealed in the autoclave under 30 atmospheres of nitrogen and heated at 175° C. for about 2 hours. About a 90% disulfide conversion was effected. About a 65 mole percent yield of n-dodecyl alcohol, based on the converted disulfide, was obtained.

Example IV

Heating 0.05 mole of di-n-dodecyl disulfide with a solution of 0.2 mole of barium hydroxide octahydrate in 150 cc. of 95% ethanol at about 225° C. for 5 hours in the autoclave under 30 atmospheres of initial nitrogen resulted in a 68% conversion of the disulfide. Based on the converted disulfide, a 68 mole percent yield of n-dodecyl alcohol was obtained.

Example V

Heating 0.05 mole of di-n-dodecyl disulfide with a solution of 0.2 mole of sodium hydroxide in 119 grams of t-butyl alcohol at about 175° C. for 2 hours in the autoclave under 30 atmospheres of initial nitrogen resulted in an 18% conversion of the disulfide. Based on the converted disulfide, a 10 mole percent yield of n-dodecyl alcohol was obtained.

Example VI

A reaction mixture comprising 0.05 mole of di-n-dodecyl disulfide and 0.5 mole of lithium hydroxide monohydrate in solution in 150 cc. of 95% ethanol was charged to the autoclave under 30 atmospheres of nitrogen and heated at 100–200° C. for about 5 hours. About a 98% disulfide conversion was effected. About a 90 mole percent yield of n-dodecyl alcohol, based on the converted disulfide was obtained.

Example VII

A reaction mixture comprising 0.05 mole of di-n-dodecyl disulfide and 0.2 mole of sodium hydroxide in solution in 129 grams of 92% aqueous isopropanol was charged to the autoclave under 30 atmospheres of nitrogen and heated at 175° C. for about 0.5 hours. About a 32% disulfide conversion resulted. About a 94 mole percent yield of n-dodecyl alcohol, based on the converted disulfide was obtained.

Example VIII

Heating 0.05 mole of di-n-dodecyl disulfide with a solution comprising 0.15 mole of potassium t-butoxide in 200 cc. of t-butyl alcohol at 100–200° C. for about 5 hours in the autoclave under 30 atmospheres of initial nitrogen resulted in a 60 weight percent yield of n-dodecyl alcohol.

Example IX

A reaction mixture was prepared by adding 0.1 mole of dibenzyl disulfide to 0.4 mole of sodium hydroxide in solution with 200 cc. of 95% ethanol. The reaction mixture was sealed in the autoclave under 30 atmospheres of nitrogen and heated at 175° C. to about 2 hours. About 100% conversion of the disulfide was effected. About a 10 mole percent yield of benzyl alcohol, based on the converted disulfide, was obtained.

Example X

In this example, 0.05 mole of di-β-phenethyl disulfide was added to about 0.5 mole of sodium hydroxide in solution with 150 cc. of 95% ethanol. The reaction mixture was sealed in the autoclave under 30 atmospheres of nitrogen and heated at 100–200° C. for about 5 hours. About 95% of the disulfide was converted to yield 7 mole percent β-phenethyl alcohol, based on the converted disulfide.

Example XI

A reaction mixture comprising 0.3 mole of di-sec-butyl disulfide and 1.2 moles of sodium hydroxide in solution with 250 cc. of 95% ethanol was sealed in the autoclave under 30 atmospheres of nitrogen and heated for 5 hours at 100–200° C. Disulfide conversion was about 95%. About a 32 mole percent yield of sec-butyl alcohol, based on the disulfide conversion was obtained.

Example XII

A reaction mixture comprising 0.1 mole of di-α-phenethyl disulfide and 0.5 mole of sodium hydroxide in solution with 300 cc. of 95% ethanol was sealed in the autoclave under 30 atmospheres of nitrogen and heated at 100–200° C. for 5 hours. The disulfide conversion was about 100% with a 56 mole percent yield of α-phenethyl alcohol based on the disulfide conversion.

Example XIII

A reaction mixture comprising 0.1 mole of di-n-dodecyl disulfide and 0.4 mole of sodium hydroxide in solution with 262 grams 92% ethyl alcohol was sealed in the autoclave under 30 atmospheres of nitrogen and heated at 300° C. for 5 hours. The disulfide conversion was about 97% with a 92 mole percent yield of n-dodecyl alcohol based on converted disulfide.

I claim as my invention:

1. A process for preparing an alcohol which comprises preparing a solution by adding a dihydrocarbyl disulfide to a molar excess of a cleaving agent selected from the group consisting of the hydroxides and alkoxides of the alkali and alkaline earth metals dissolved in a solvent selected from the group consisting of anhydrous lower alkanols and aqueous lower alkanols containing up to about 10 weight percent water and then heating said solution at a temperature of from about 100° C. to about 300° C. thereby forming the corresponding alcohol and mercaptan, and recovering said alcohol from the reaction mixture, the aforesaid disulfide being represented by the general formula R—S—S—R' wherein R and R' are independently selected from the group consisting of alkyl, cycloalkyl, aryl, alkaryl and aralkyl radicals, at least one of which is bonded to the disulfide group by means of a carbon atom containing at least one hydrogen atom attached thereto.

2. The process of claim 1 further characterized in that said solution is heated in contact with a mild oxidizing agent capable of oxidizing said mercaptan to the corresponding disulfide.

3. The process of claim 1 further characterized in that said dihydrocarbyl disulfide is a dialkyl disulfide.

4. The process of claim 3 further characterized in that said cleaving agent is an alkali metal hydroxide.

5. The process of claim 2 further characterized in that said oxidizing agent is a sulfoxide.

6. The process of claim 5 further characterized in that said sulfoxide is a dialkyl sulfoxide.

7. The process of claim 6 further characterized in that said cleaving agent is sodium hydroxide and said sulfoxide is dimethyl sulfoxide.

8. The process of claim 3 further characterized in that the dialkyl disulfide is di-n-dodecyl disulfide.

9. The process of claim 1 further characterized in that said solvent comprises ethanol.

10. The process of claim 1 further characterized in that said solvent comprises isopropanol.

References Cited

UNITED STATES PATENTS 2,837,573   6/1958   Mavity _____ 260—632
2,976,229   3/1961   Brown et al.

(Other references on following page)

OTHER REFERENCES

Reid: "Org. Chem. of Bivalent S," vol. I (1958), pp. 19–21, 111, 112 and 128–141.

Reid: "Org. Chem. of Bivalent S," vol. III (1960), pp. 363, 372, 375 and 376.

Billheimer et al.: "J. Am. Chem. Soc.," vol. 52 (1930), pp. 4338–4344.

Kharasch: "Org. S Cmpds." vol. 1 (1961), pp. 173–174.

Mack et al.: "Text of Chem." (1949), p. 396.

LEON ZITVAR, Primary Examiner

J. E. EVANS, Assistant Examiner

U.S. Cl. X.R.

260—608, 609, 617, 618, 631, 643